United States Patent [19]
Vecchiotti et al.

[11] Patent Number: 5,909,018
[45] Date of Patent: Jun. 1, 1999

[54] AUTOMATIC FINE-TUNING OF ROTOR TIME CONSTANT AND MAGNETIZING CURRENT IN FIELD-ORIENTED ELEVATOR MOTOR DRIVE

[75] Inventors: Alberto Vecchiotti, Middletown, Conn.; Roy Stephen Colby, Raleigh, N.C.

[73] Assignee: Otis Elevator Company, Farmington, Conn.

[21] Appl. No.: 08/996,266

[22] Filed: Dec. 22, 1997

[51] Int. Cl.$^6$ .............................. B66B 1/28; G05B 13/04; H02P 5/28

[52] U.S. Cl. ......................... 187/393; 187/296; 364/150; 318/807

[58] Field of Search .................................... 187/393, 296, 187/391; 364/150, 152, 161; 318/610, 609, 807

[56] References Cited

U.S. PATENT DOCUMENTS 5,272,429  12/1993  Lipo et al. ............................... 318/808
5,689,169  11/1997  Kerkmann et al. ...................... 318/807

OTHER PUBLICATIONS

M. Depenbrock and N.R. Klaes, *Determination of the Induction machine Parameters and their Dependencies on Saturation*, Ruhr–University Bochum, Germany, pp. 17–22.

N.R. Klaes, *Parameters Identification of an Induction Machines with Regard to Dependencies on Saturation*, IEEE Transactions on Industry Application, vol 29, No. 6, Nov. 1993.

A. M. Khambadkone and J. Holtz, *Vector–Controlled Induction Motor Drive with a Self–Commissioning Scheme*, IEEE Transactions on Industrial Electronics, vol. No. 5, Oct. 1991.

J. Holtz and T. Thimm, Identificaton of the Machine Parameters in a Vector–Controlled Induction Motor Drive, IEEE Transactions on Industry Applications Vol. 27, No. 6 Jul./Aug. 1991.

T. Rowan, R. Kerkman and D. Leggate, A Simple On–Line Adaption for Indirect Field Orientation of an Induction Machine, IEEE Transaction on Industry Applications, vol. 27, No. 4 Jul/Aug 1991.

R. Kerkman, J. Thunes, T. Rowan and D. Schlegal, A Frequency–Based Determination of Transient Inductance and Rotor Resistance for Field Commissiong Purposes, IEEE Transactions on Industry Applications, vol. 32, No. 3, May/June 1996.

H. Schierling, Self–Commissioning–A Novel Feature of Modern Inverter–Fed Induction Motor Drives, pp.287–290.

M. Summer and G. Asher, Autocommissioning for voltage–referenced voltage–fed vector controlled induction motor drives, IEEE Proceedings, vol.140, No. 3 May 1993.

Kudor et al, Self–Commissioning for Vector Controller Inductors Motors, IEEE 1993, pp.528–535.

Tungpimolrut et al, A Direct Measuring Method of Machine Parameters for Vector–Controlled Induction Motor Drives, 1993 IEEE pp. 997–1002.

Green et al, Measurments and On–line Estimation Approaches to a Parameter Variation in Vector Controllers, IEEE Colloq. 1993, pp. 3/1–3/5.

(List continued on next page.)

*Primary Examiner*—Robert E. Nappi

[57] ABSTRACT

An elevator controller 7 is provided with logic 48 which automatically calculates a motor time constant ($\tau_R$) for a field-oriented current regulator/motor drive 20 by running the elevator up and down while computing a loss component VDX and while varying $\tau_R$ and determining the value of $\tau_R$ at which VDX for the up and down elevator runs are the same within a predetermined tolerance and which automatically calculates a magnetizing current (Id) by running the elevator in a predetermined direction while calculating a motor voltage Vm and varying Id and determining a new value of $\tau_R$ by performing the up/down elevator run until Vm is within a predetermined tolerance of a target voltage $V_T$.

7 Claims, 8 Drawing Sheets

OTHER PUBLICATIONS

Wade et al, Parameters Identification for Vector Controlled Induction Machines, Heriot–Wat University, UK, pp. 1187–1192.

Bunte et al, Parameters Identification of an Inverter–fed Induction Motor at Standstill with Correlation Method, Universal Paderborn –Germany, The European Power Electronics Association 1993, pp. 97–102.

D. W. Novotny and T. A. Lipo, Vector Control and Dynamics of AC Drives, Oxform Science Publications, pp. 205–251.

DeDonker et al, The Universal Field Oriented Controller, University of Wisconsin.

Lorenz, Tuning of Field–Oriented Induction Motor Controllers for High–Performance Applications, IEEE Transactions on Industry Applications, Vol. 1A–22, No. 2, Mar./Apr. 1986.

Wang et al, An Automated rotor time Constant Measurement System for Indirect Field–Oriented Drives, IEEE Transaction on Industry Applications, Vol. 24, No. 1, Jan./Feb. 1988.

Lorenz et al, A control systems Perspective of field oriented Control for AC Servo Drives, University of Wisconsin.

Novotny and Lipo, WEMPEC, Wisconsin Electric Machines and Power Electronics Consortium, Tutorial Report, Chapter 4–1–4–73.

AUTOMATIC FINE-TUNING OF ROTOR TIME CONSTANT AND MAGNETIZING CURRENT IN FIELD-ORIENTED ELEVATOR MOTOR DRIVE

CROSS REFERENCES TO RELATED APPLICATIONS

Co-pending U.S. patent applications, Ser. Nos. 08/996,265, 08/996,263, 08/986,594, 08/996,264 and 08/996,262, filed contemporaneously herewith, contain subject matter related to that disclosed herein.

TECHNICAL FIELD

This invention relates to automatic calibration of a motor/drive system and more particularly to fine tuning of a rotor time constant in a field-oriented (or vector-controlled) elevator motor drive.

BACKGROUND OF THE INVENTION

It is known that an indirect field-oriented (or vector-controlled) motor drive provides high performance torque control of an induction motor drive. It is also known in the art of elevator motor controllers to use indirect field-oriented drives to control an elevator induction motor. Such drives are multi-speed variable frequency drives. It is further known that such drives require precise knowledge of the rotor time constant ($\tau_R$) and magnetizing current (Id) of the motor to establish field orientation.

One technique to accurately determine the rotor time constant and magnetizing current is to analyze the motor in an engineering laboratory using expensive test equipment and several engineering man-hours. However, in modernization or retrofit applications, where a new drive replaces an older drive in an existing elevator system, it is not convenient or cost effective to remove or uncouple the motor from the elevator for evaluation of the rotor time constant and magnetizing current parameters.

Another technique to determine the rotor time constant and magnetizing current involves dispatching a highly skilled engineer to the job site to tune the drive to the motor using special test equipment. However, such a technique is costly and time consuming and, as such, makes modernizing elevator motor drives unattractive for building owners.

Also, various techniques have been described for modeling the rotor time constant of the motor. One technique is described in T. M. Rowman, "A Simple On-Line Adaption for Indirect Field Orientation of an Induction Machine", IEEE Transactions on Industry Applications, Vol. 27, No. 4, July/August 1991; however, such technique does not provide accurate gain adjustment when the direction of rotation of the motor is reversed, such as occurs with elevator motors which are bi-directional. Another technique is described in C. Wang, et al, "An Automated Rotor Time Constant Measurement System for Indirect Field-Oriented Drives", IEEE Transactions on Industry Applications, Vol. 24, No. 1, January/February 1988; however, such technique requires that the torque constant and load inertia are accurately known beforehand.

DISCLOSURE OF THE INVENTION

Objects of the invention include provision of automatic, on-site, fine-tuning of a rotor time constant and magnetizing current parameters of a motor in field-oriented drives for elevators, which does not require removal or uncoupling of the motor from the elevator system.

According to the present invention, a method for calculating at least one parameter of an elevator motor operated by a field-oriented controller, includes: a) setting a rotor time constant ($\tau_R$) and a magnetizing current (Id) to initial values; b) running the elevator in a first direction; c) calculating a loss component VDX during the elevator run as follows: VDX=Vd+($\omega_R$+Iq/(Id$\tau_R$)) L$\sigma$Iq, where: Id=d-axis current, Iq=q-axis current, Vq=q-axis voltage, $\omega_R$=motor speed, L$\sigma$=motor transient inductance, where Vd, Id, Iq, $\omega_R$, are signals provided by the field-oriented controller, where L$\sigma$ is a predetermined motor constant; d) running the elevator in a second direction, opposite to said first direction; e) performing step (c) during the elevator run in said second direction; and f) varying $\tau_R$, performing steps (b)–(e), and determining the value of $\tau_R$ at which the value of XD for the elevator runs for both directions are substantially the same, within a predetermined tolerance.

According further to the present invention, after step (f), performing the steps of: h) running the elevator in a predetermined direction; i) calculating a motor voltage (Vm) as follows: Vm=(Vd$^2$+Vq$^2$)$^{1/2}$; j) calculating a target voltage (V$_T$); and k) varying Id and performing steps (b)–(j) until Vm is within a predetermined tolerance of V$_T$.

The invention represents a significant improvement over the prior art by allowing the rotor time constant and magnetizing current in field-oriented (or vector controlled) elevator motor drives to be automatically fine-tuned at the job site. The invention does not require removing the motor from the job site or uncoupling the motor from the elevator system. Thus, the invention performs such tuning under a loaded condition, not the standard no load test common for industrial drives. Also, the invention does not require a specially trained engineer with special test equipment to tune the motor/drive system. Thus, the invention allows new motors drives to be retrofit into job sites at low cost of installation and calibration. Accordingly, automatic fine-tuning of the rotor time constant and magnetizing current at the field site saves both time and money. As a result, the present invention makes it more attractive for building owners to upgrade their elevator systems to modern controls, which are currently economically impractical due to the high cost of determining parameters of older motors found in modernization job sites. The invention is particularly useful when core losses of the motor cannot be neglected in the calculation of these motor parameters or when it is not practical or possible to accurately measure stator resistance. Still further, the present invention allows existing elevator motion control and safety systems to remain in place throughout the calibration procedure of the present invention.

The foregoing and other objects, features and advantages of the present invention will become more apparent in light of the following detailed description of the exemplary embodiments thereof, as illustrated in the accompanying drawings.

BEST MODE FOR CARRYING OUT THE INVENTION

Figure 1:
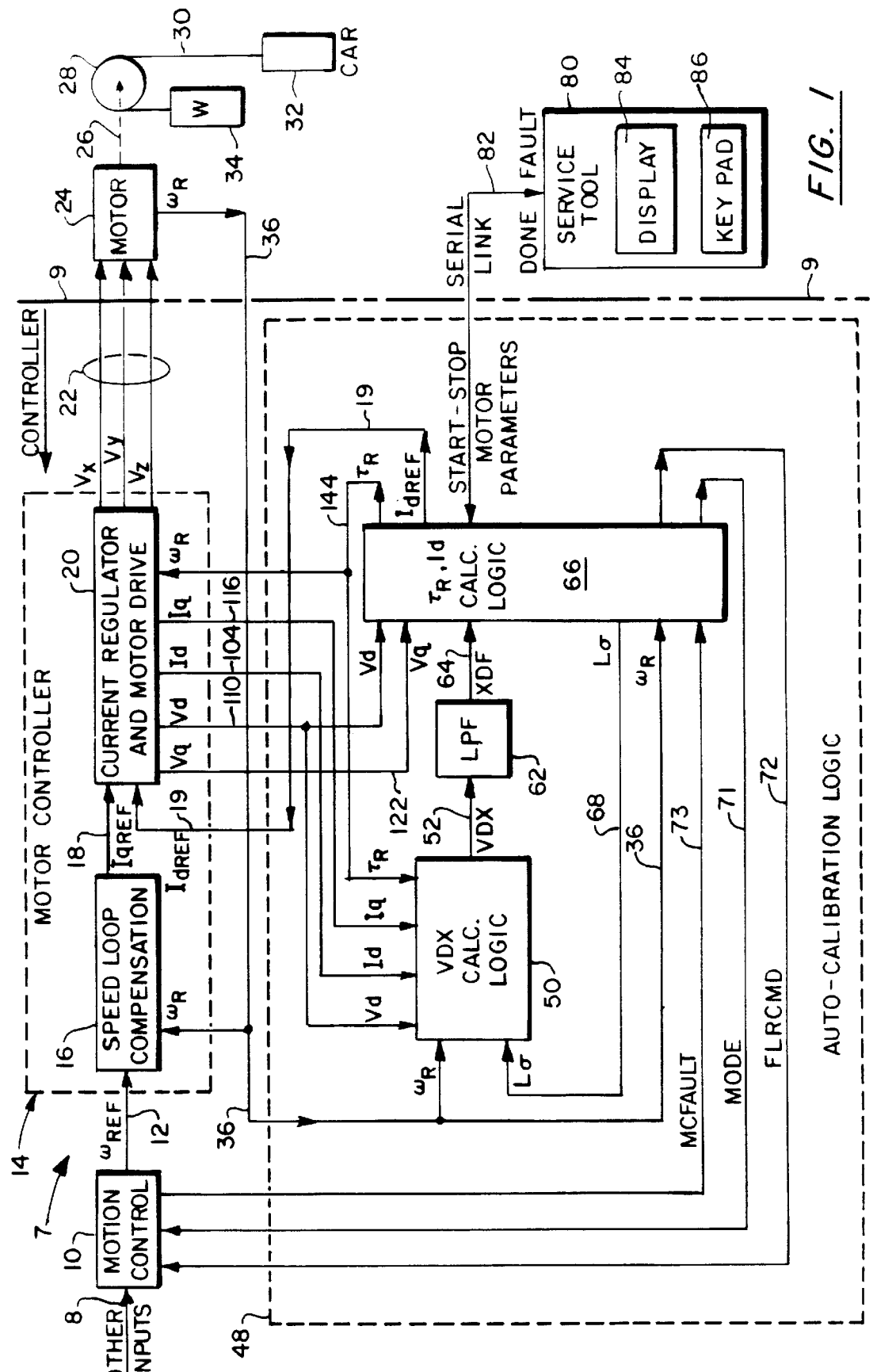
FIG. 1 is a block diagram of a controller having auto-calibration logic, in accordance with the present invention.

Referring to FIG. 1, that shown to the left of the line 9 is a portion of an elevator controller 7, which includes a motion control circuit 10 which receives floor destination commands from operational control logic (not shown) on a line 8 and provides a speed reference profile $\omega_{REF}$ on a line 12 to a motor controller 14. The motor controller 14 comprises speed loop compensation logic 16 which provides a current reference signal $I_{qREF}$ on a line 18 to a field-oriented current regulator/motor drive circuit 20. The circuit 20 provides 3-phase drive voltages $V_X$, $V_Y$, $V_Z$ on lines 22 to a motor 24, e.g., a three phase induction motor. The motor 24 provides a speed feedback signal indicative of the rotational speed of the motor 24 on a line 36 back to the controller 7.

Two examples of three phase AC induction motors which may be used with the present invention are, Model LUGA-225LB-04A, by Loher, having a rated power of 45 KW, rated voltage of 355 volts, rated speed of 1480, and rated frequency of 50 Hz, in a geared configuration; and Model 156MST, by Tatung (of Taiwan), having a rated power of 40 KW, rated voltage of 500 volts, rated speed of 251, and rated frequency of 16.7 Hz, in a gearless configuration. Other motors having other rated parameters may be used if desired.

The motor 24 is connected by a mechanical linkage 26, e.g., a shaft and/or a gearbox, to a sheave 28. A rope or cable 30 is wrapped around the sheave 28 and has one end connected to an elevator car 32 and the other end connected to a counterweight 34. The weight of the counterweight is typically equal to the empty car weight plus 40–50% of the rated load for the car.

Other elevator system configurations, and with or without a counterweight, with or without a gearbox, may be used if desired to convert the output torque of the motor 24 to movement of the elevator cab 32, such as dual lift (where two elevator cars are connected to a single rope, the cars move in opposite directions and each car provides a counterweight for the other car), drum machine (where the rope is wrapped around a drum driven by a motor), etc.

The speed loop compensation logic 16 may be any motor speed control compensation logic having one or more control loops, such as a proportional-plus-integral outer loop control and a proportional inner loop control, such as that described in co-pending U.S. patent application Ser. No. 08/996,262, filed contemporaneously herewith. Other motor speed control compensation may be used. The type of motor speed control compensation is not critical to the present invention.

Figure 2:
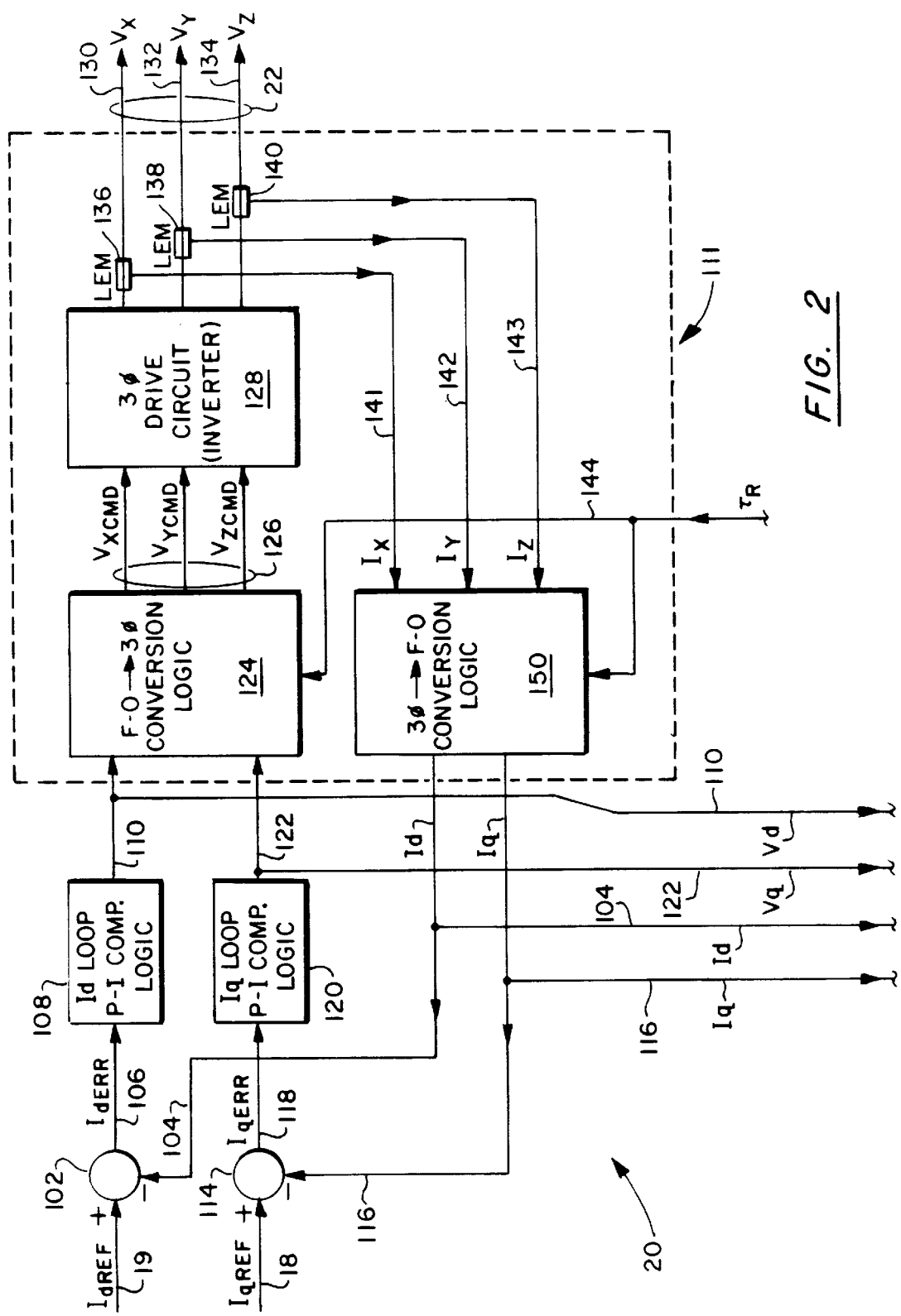
FIG. 2 is a block diagram of a field-oriented current regulator/motor drive circuit within the controller of FIG. 1, in accordance with the present invention.

Referring to FIG. 2, it is known in the art of field-oriented motor control that such control uses current and voltage parameters corresponding to two axes. In particular, the field-oriented current regulator/motor drive 20 of FIG. 1 comprises two current control loops, one for the d-axis current Id and one for q-axis current Iq. The Id loop receives an $I_{dREF}$ signal on the line 19 to a positive input to a summer 102. A measured or feedback d-axis current signal Id on a line 104 is fed to a negative input to the summer 102. The output of the summer 102 is an error signal $I_{dERR}$ on a line 106 which is fed to control compensation logic 108, such as proportional-plus-integral current loop control. Other current loop control compensation may be used if desired. The logic 108 provides a d-axis voltage command signal $V_{dCMD}$ online 110.

For the q-axis, the Iq loop receives an $I_{qREF}$ signal on the line 18 to a positive input to a summer 114. A measured or feedback q-axis current signal Iq on a line 116 is fed to a negative input to the summer 114. The output of the summer 114 is an error signal $I_{qERR}$ on a line 118 which is fed to control compensation logic 120, e.g., proportional-plus-integral logic similar to the logic 108. The output of the logic 120 is a q-axis voltage command signal $V_{qCMD}$ on a line 122.

The voltage commands $V_{dCMD}$ and $V_{qCMD}$ are fed to known field-oriented to three-phase conversion logic 124 which converts the d-axis and q-axis voltage commands to three phase voltage commands $V_{XCMD}$, $V_{YCMD}$, $V_{ZCMD}$ on lines 126. The phase voltage commands $V_{XCMD}$, $V_{YCMD}$, $V_{ZCMD}$ are fed to a known three phase drive circuit (or inverter) 128 which provides three phase voltages $V_X$, $V_Y$, $V_Z$ on lines 130, 132, 134, respectively, to drive the motor 24.

Within the drive circuit 128 (details not shown), each of the voltage commands $V_{XCMD}$, $V_{YCMD}$, $V_{ZCMD}$ on lines 126 are converted to percent duty cycle commands indicative of the corresponding input voltage level. The percent duty cycle is converted into a pulse-width-modulated drive signal which drives power transistors to provide the pulse-width-modulated, variable frequency, three phase voltages $V_X$, $V_Y$, $V_Z$ on lines 130, 132, 134, respectively. The conversions within the drive 128 are performed using electronic components and/or software well known in the art of motor drive circuits. Any other type of drive circuit that receives input voltage commands and provides output phase voltages may be used, and the phase voltages need not be pulse-width modulated.

Phase currents $I_X$, $I_Y$, $I_Z$ associated with the voltages $V_X$, $V_Y$, $V_Z$, respectively, are measured by known current sensors 136, 138, 140, e.g., closed-loop Hall-effect current sensors (such as LEMS), respectively, and are provided on lines 141, 142, 143, respectively. The phase currents $I_X$, $I_Y$, $I_Z$ are fed to known three phase to field oriented conversion logic 150, which provides a known conversion from phase currents to d-axis and q-axis currents Id, Iq on the lines 104, 116 which are fed to the summers 102,114, respectively, as feedback currents.

The converters 124,150 provide known conversions between vector (d and q axis) parameters and per-phase parameters, such as that described in D. Novotny, et al, "Vector Control and Dynamics of AC Drives", Oxford University Press, 1996, Ch 5, pp 203–251. The converters 124,150 may likely implement such conversions in software using a microprocessor or the like.

It is known in the art of field oriented drives that the value of the rotor time constant $\tau_R$ of the motor being controlled is required to perform the conversion to and from the field oriented d and q axes. In particular, $\tau_R$ is used to establish the correct slip frequency $\omega_S$ to achieve field orientation. The value of the rotor time constant $\tau_R$ is provided to the two converters 124, 150 on a line 144.

Referring to FIG. 1, the present invention comprises auto-calibration logic 48 which automatically determines the correct value of the rotor time constant $\tau_R$ and magnetizing current (Id) of the motor, discussed more hereinafter. The logic 48 comprises known electronic components, which may include a microprocessor, interface circuitry, memory, software, and/or firmware, capable of performing the functions described herein.

Figure 3:
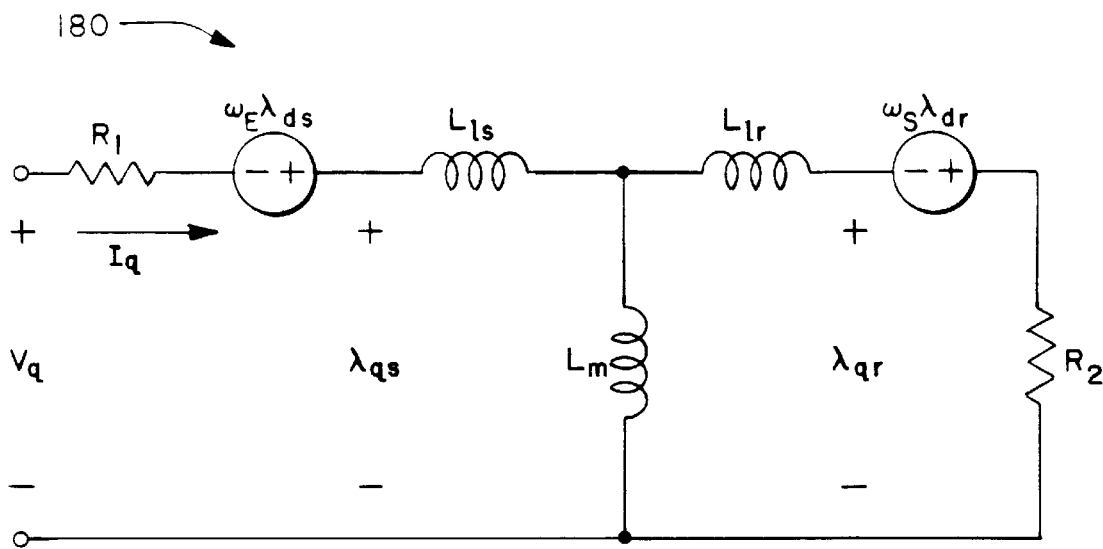
FIG. 3 is an induction motor coupled circuit diagram for q-axis variables for a field-oriented driven motor, in accordance with the present invention.
Figure 4:
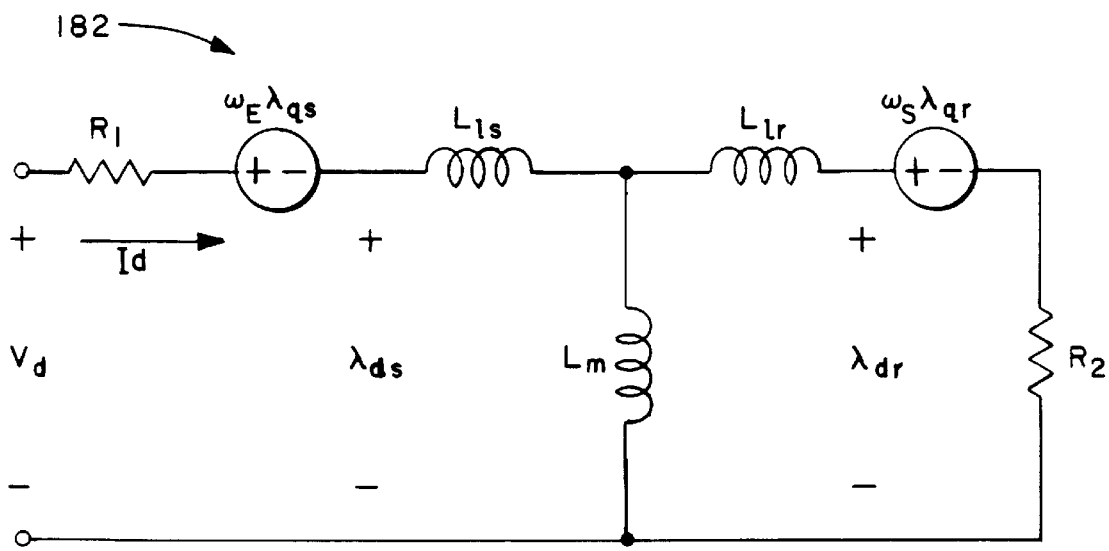
FIG. 4 is an induction motor coupled circuit diagram for d-axis variables for a field-oriented driven motor, in accordance with the present invention.

Referring to FIGS. 3 and 4, coupled circuit diagrams 180,182, for q-axis and d-axis variables, respectively, for a field-oriented driven motor, have circuit parameters defined as follows:

Id=d-axis (or magnetizing) current; Iq=q-axis (or torque) current;

Vd=d-axis voltage; Vq=q-axis voltage;

$R_1$=stator resistance;

$L_{ls}$=stator leakage inductance; $L_{lr}$=rotor leakage inductance;

Lm=mutual inductance;

$\lambda_{ds}$=d-axis stator flux; $\lambda_{dr}$=d-axis rotor flux;

$\lambda_{qs}$=q-axis stator flux; $\lambda_{qr}$=q-axis rotor flux;

$\omega_S$=slip frequency; $\omega_E$=electrical frequency of the motor currents; and $R_2$=rotor resistance.

For field orientation conditions to exist, as is known, the induction motor coupled circuit diagrams of FIGS. 3 and 4 require that $\lambda_{qr}=0$, $\lambda_{dr}=LmId$, $\lambda_{qs}=L\sigma Iq$ and $\lambda_{ds}=LsId$, where $Ls=Lm+L_{ls}$, and where $L\sigma$ is the transient inductance of the motor.

The variable frequency drive described herein operates with a constant magnetizing current. All current and voltage motor parameters designated herein by a subscript "r" or "R" are rotor parameters, and all other current and voltage motor parameters, unless described otherwise, are stator parameters.

Also, in a field oriented drive, as is known, the controller reference frame is oriented so that the d-axis is aligned with the rotor flux. Referring to FIG. 4, in steady state, where the transients have stabilized (i.e., dId/dt=0 and dIq/dt=0), the voltage across the inductors Lm, $L_{ls}$ is 0 v. Thus, the equation for the d-axis stator voltage Vd for a field-oriented drive is defined as:

$$Vd=R_1Id-\omega_E L\sigma Iq \qquad \text{Eq. 1}$$

where the parameters of the Eq. 1 are defined above with FIG. 4.

It is also known that $\omega_E=\omega_R+\omega_S$ and $\omega_S=Iq/(Id\tau_R)$, where $\omega_R$ is the rotational speed of the rotor. Substituting this for $\omega_E$ in Equation 1 yields:

$$Vd=R_1Id-(\omega_R+Iq/(Id\tau_R))L\sigma Iq \qquad \text{Eq. 2}$$

Moving the right side of Eq. 2 to the left side, we define a new parameter, $V_{dERR}$, as:

$$V_{dERR}=Vd-R_1Id+(\omega_R+Iq/(Id\tau_R))L\sigma Iq \qquad \text{Eq. 3}$$

A zero value of the $V_{dERR}$ indicates that the drive is field oriented, i.e., that Equation 1 is satisfied, when motor core losses can be neglected.

However, we have found that two factors may introduce errors into the calculation of $V_{dERR}$. The first factor is errors in the stator resistance estimate ($R_1$). In particular, we have found that the stator resistance $R_1$ is difficult to measure in the drive due to the low signal amplitudes involved and that off-line tests of stator resistance do not accurately predict the d-axis voltage during drive operation. While this error does not impact the current regulator closed loop operation of the indirect field oriented drive (which regulates the current to achieve desired performance independent of the value of R1), it does impact the accuracy of the calculation of $V_{dERR}$.

The second factor is core loss $L_C$ in the induction motor, which is not modeled in the standard induction motor model of FIGS. 3 and 4. The core loss $L_C$ at constant motor flux is approximately proportional to motor speed and is manifested as a component of voltage in the d-axis of the motor (Vd). Also, core loss must be supplied electrically by the stator and voltage current, even when there is no torque, i.e., when the q-axis current Iq is zero. Thus, the electrical power input to the motor to supply the core loss appears as a positive component of Vd.

Figure 8:
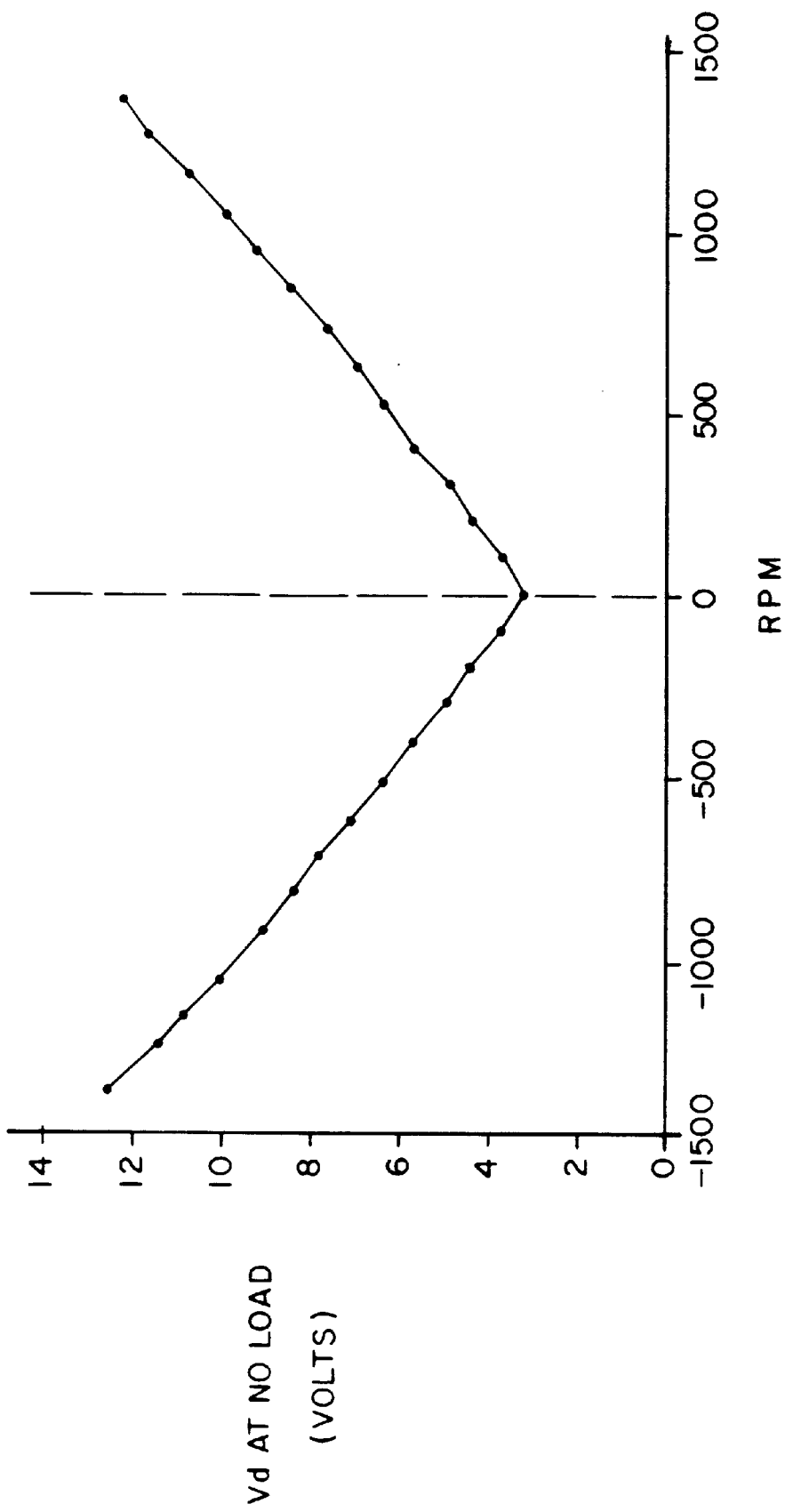
FIG. 8 is a graph of Vd vs. RPM at no load for a motor running in clockwise and counterclockwise directions, in accordance with the present invention.

More specifically, referring to FIG. 8, experiments on induction motors have shown, as is known, that the core loss component of Vd can be more than double the IR voltage drop component at rated speed. FIG. 8 shows core loss increases with speed by a plot of Vd vs. motor speed for a 32 kW 4-pole induction motor running at no load. In particular, at no load, Iq=0, and plugging Iq=0 into Eq. 1, gives Vd=$R_1$Id, where Id is a constant. Thus, Vd should be a constant over motor speed. However, from the graph of FIG. 8, it can be seen that:

$$Vd=R_1Id+L_C(\omega_E)$$

where core loss Lc is a function of motor speed $\omega_E$.

Thus, rather than computing the $V_{dERR}$ signal, the present invention computes a loss component VDX equal to the stator I-R voltage drop ($R_1$Id) plus the core loss ($L_C$) which gives the following equation, derived from Eq. 3 and adding the core loss $L_C$:

$$VDX=Vd+\omega_E L\sigma Iq=R_1Id+L_C \qquad \text{Eq. 4}$$

where Id, Iq, and Vd are stator parameters. Also, $\omega_E=\omega_R+Iq/(Id\tau_R)$, as is known, which, when substituted into Eq. 4, gives:

$$VDX=Vd+(\omega_R+Iq/(Id\tau_R))L\sigma Iq \qquad \text{Eq. 5}$$

If the rotor time constant $\tau_R$ is correct, two measurements made at the same speed but at different loads (i.e., different values of Iq) should yield substantially equal values of VDX.

We have also found that the sign of VDX indicates whether the rotor time constant is low or high. In particular, VDX will be positive when the rotor time constant $\tau_R$ parameter is too low and negative when $\tau_R$ is too high, regardless of torque or direction and regardless of the IR drop and core loss.

The present invention makes an up run and a down run of the elevator with an empty car (using normal motion and speed profiles), thereby achieving two different load conditions. The value of VDX is computed and filtered to reduce noise (as a signal XDF) during the up run and the down run and the values of $\tau_R$ and $I_{dREF}$ (and thus Id) are adjusted until the values of XDF for the up and down runs are equal, or within a predetermined tolerance (discussed more hereinafter). The difference in the load conditions for up and down runs exists because the counterweight 34 (FIG. 1) has a weight equal to the empty car weight plus 40–50% of the rated load for the car as discussed hereinbefore.

Once a value for $\tau_R$ has been obtained from the above search, the value of magnetizing current reference $I_{dREF}$ (which results in a corresponding change to the magnetizing current Id) is adjusted to achieve the correct value of motor voltage under loaded conditions (i.e., during a down run with an empty car). A change in magnetizing current Id will change the flux level and therefore the saturation of the magnetizing characteristics of the motor and a change in the flux level will change the required torque current. As a result, the rotor time constant $\tau_R$ may change. Thus, the rotor time constant $\tau_R$ tuning described above is repeated using the new adjusted value of magnetizing current $I_{dREF}$, after which, the motor voltage is checked and the magnetizing current $I_{dREF}$ is adjusted again, if necessary, to adjust the motor voltage within a predetermined tolerance of the rated value.

Referring to FIG. 1, more specifically, the auto-calibration logic 48 comprises VDX calculation logic 50 which receives the necessary parameters to compute VDX using Equation 4. VDX is calculated only when the speed parameter $\omega_R$ is greater than 50% of the full or rated or contract speed (RPM_Duty), which provides a windowing function to allow the calculation to occur when the voltage and current measurements are the most accurate (i.e., at or near rated speed). Such a windowing function is not required but provides more accurate calculations. Also, other windowing or signal scaling techniques may be used to avoid erroneous signals. For example, VDX may be multiplied by the motor speed $\omega_R$ or $\omega_E$ which would weigh the VDX signal more heavily at high speeds where the measurements are more accurate and the motor is at rated speed.

The value of VDX is provided on a line 52 to a low pass filter 62 having a break frequency at 10 Hz to reduce measurement noise. Other break frequencies for the filter 62 may be used if desired. The low pass filter 62 provides a filtered signal XDF on a line 64 to $\tau_R$, $I_{dREF}$ calculation logic 66. Other types of filters may be used if desired.

The logic 66 provides the constant $L\sigma$ to the VDX calculation logic 50 on a line 68. The logic 66 computes the rotor time constant $\tau_R$ which is provided on the line 144 to the current regulator/motor drive circuit 20 and to the VDX calculation logic 50. The logic 66 also computes $I_{dREF}$ which is provided on a line 76 to the current regulator/motor drive circuit 20.

The logic 66 also provides MODE and FLRCMD signals on lines 71,72, respectively, to the motion control logic 10. The MODE flag causes the motion logic 10 to accept floor commands from the FLRCMD signal on the line 72.

The FLRCMD signal commands the motion controller 10 to perform an elevator run in a commanded direction for a commanded number of floors (or to a particular destination floor) using a standard predetermined speed prodiscussed $\omega_{REF}$ (FIG. 7) in the motor control 10, discussed hereinafter. The motion control logic 10 also provides a motor controller fault signal MCFAULT on a line 73 to the logic 66 to indicate if a fault has occurred during an elevator run. During the elevator run, the elevator is run through a normal speed profile using an empty car with the normal safety features enabled.

Figure 7:
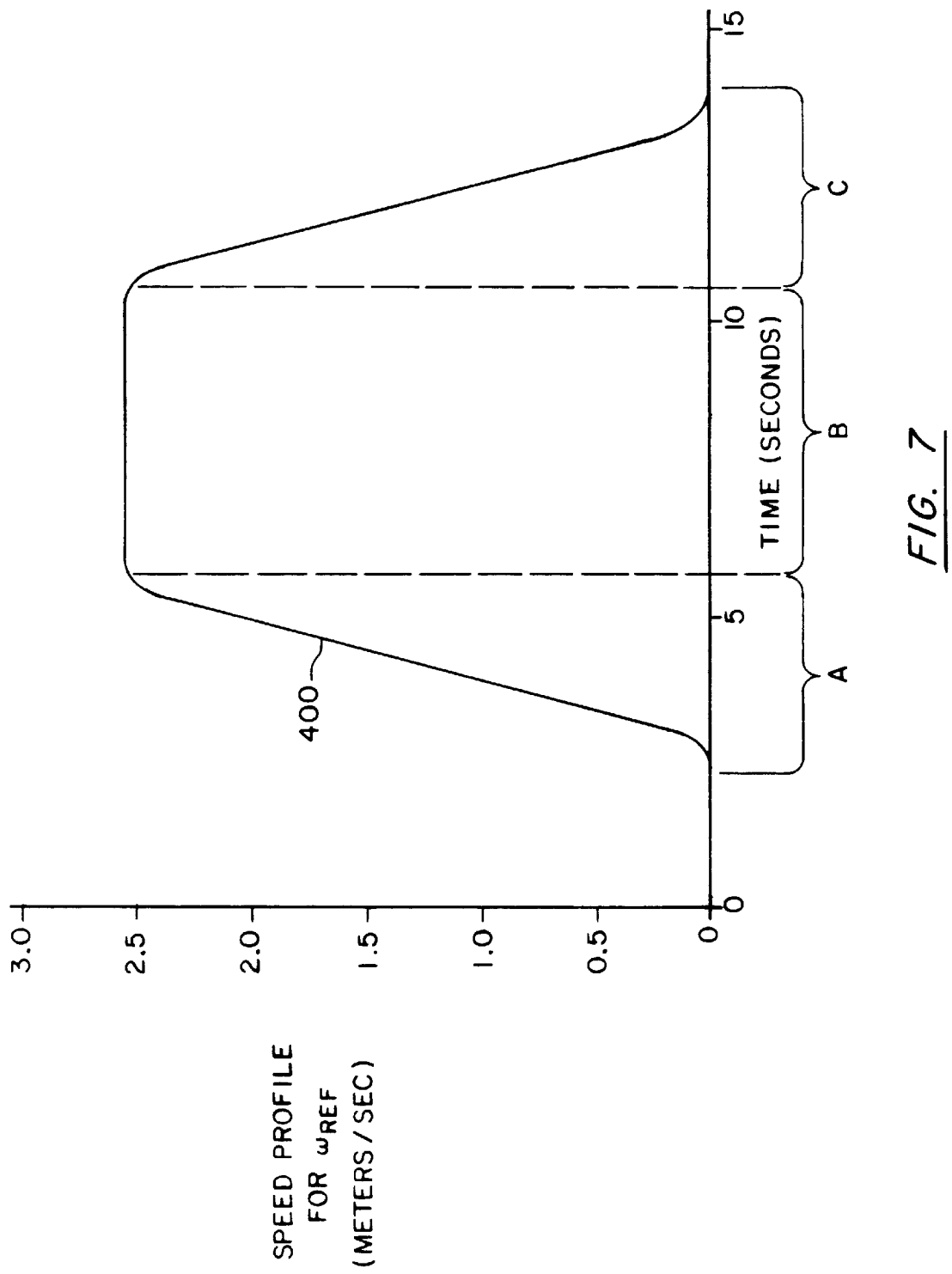
FIG. 7 is a graph of speed profile vs. time, in accordance with the present invention.

Referring to FIG. 7, a standard speed profile 400 for $\omega_{REF}$ provided by the motion control logic 10 has a ramp up region A, a constant speed region B (where the motor runs at the duty or contract speed for a given application), and a ramp down region C. The duration of the constant speed portion B is based on the number of floors (or destination floor) commanded by the FLRCMD signal. Whenever an up or down elevator run is commanded herein, the number of floors commanded are such that the constant speed portion B of the elevator run has a duration long enough to allow transients in the system to stabilize, e.g., at least about 3 seconds, which corresponds to about 3 or 4 floors, depending on the building floor height. The profile 400 is merely for illustration purposes and other ramp up/down rates, duty speeds, and overall profiles may be used, provided there is a constant speed portion having a duration long enough to allow system transients to stabilize. The number of floors or destination floor may be provided by the service tool 80 over the link 82.

The calculation logic 66 also communicates with a service tool 80 over a serial link 82. The service tool 80 includes a display 84 and a keypad (or keyboard) 86 for entering data into the service tool 80 and over the link 82 to the controller 7. In particular, the logic 66 receives a Start command and a Stop command over the link 82 from the service tool 80, which controls when auto-calibration is started and stopped (or aborted), respectively.

The elevator motion commands (destination floors) may be entered manually using the service tool 80, or, alternatively, the elevator may be set up to cycle between two predetermined floors using the service tool 80. Also, to simplify implementation and maximize safety, all motion of the elevator may be under control of the normal elevator control systems and all normal hoistway safety functions may be in effect.

Also, the logic 66 receives motor parameters necessary to perform the auto-calibration logic 48 described herein, such as $L\sigma$, and initial values of $\tau_R$ ($\tau_{R\_INIT}$) and d-axis current loop reference $I_{dREF}$, as discussed more hereinafter. The logic 66 provides a DONE signal and a FAULT signal to the service tool 80 over the link 82. The DONE signal indicates when auto-calibration is complete and the FAULT signal indicates when a fault has been detected during auto-calibration.

Figure 5:
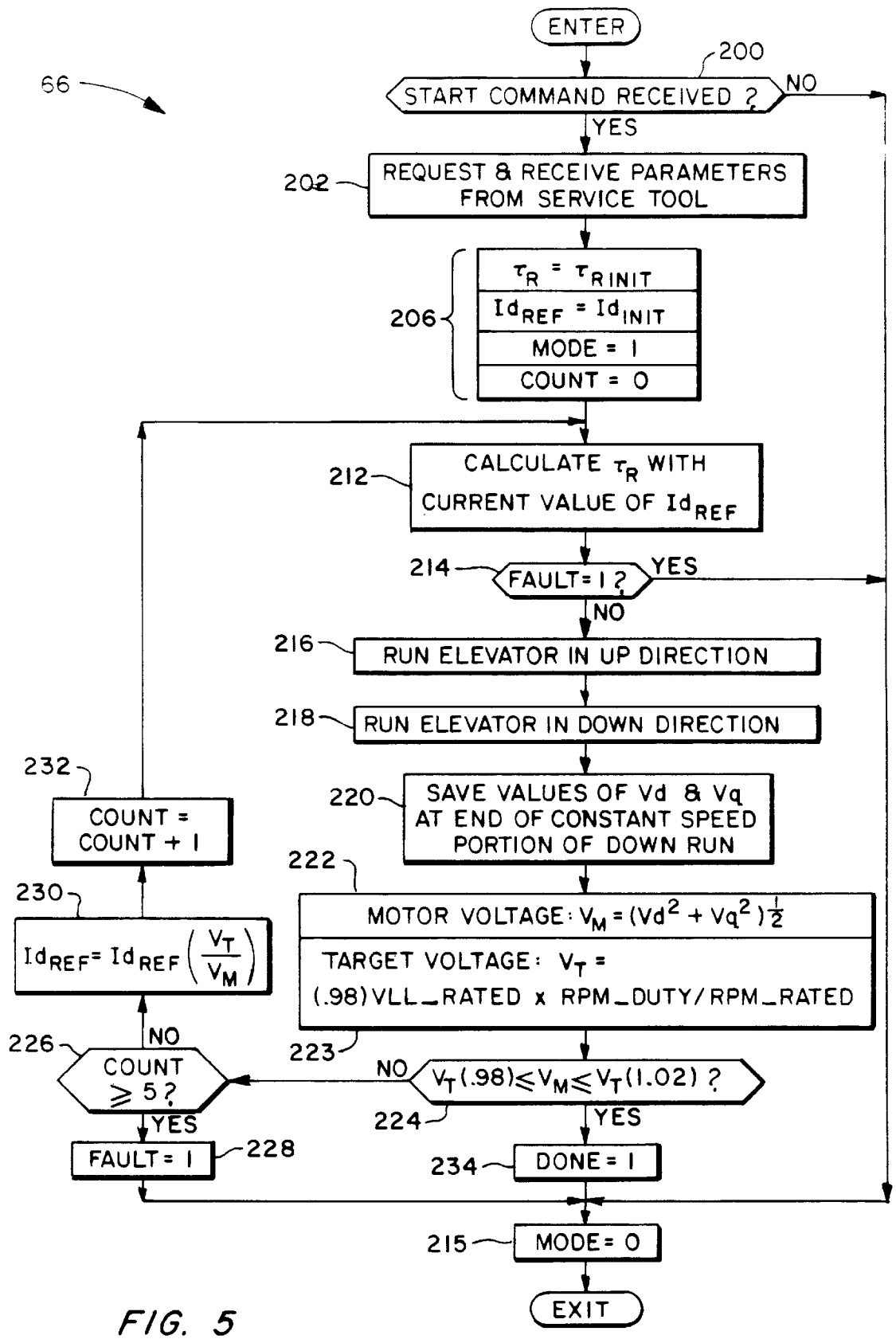
FIG. 5 is a logic flow diagram of a portion of the auto-calibration logic of FIG. 1, in accordance with the present invention.

Referring to FIG. 5, a top-level flow diagram for the $\tau_R$, $I_{dREF}$ calculation logic 66 begins at a step 200, which checks to see whether a start command has been received from the service tool 80 (FIG. 1). If a start command has not been received, the logic 66 exits. If a start command has been received, a step 202 requests and receives the necessary parameters to perform the auto-calibration logic 48, such as $L\sigma$, $I_{dINIT}$, $\tau_{R\_INIT}$ from the service tool 80.

Some or all of the parameters $L\sigma$, $\tau_{R\_INIT}$, $I_{dINIT}$ may be set based on the values of $R_1$, $L\sigma$, $\tau_R$, $I_{dRATED}$, respectively, previously calculated by another motor test, such as that described in Copending U.S. Pat. application, Ser. No. 08/996,265.

Alternatively, some or all of the parameters $L\sigma$, $\tau_{R\_INIT}$, $I_{dINIT}$ may be approximated from motor data sheet parameters, as follows:

$$L\sigma = Ls - (Lm^2/Lr)$$

$$\tau_{R\_INIT} = Lr/Rr$$

$$I_{dINIT} = I_{NO-LOAD}$$

where Ls is the stator winding inductance, Lr is the rotor winding inductance, Lm is the motor mutual inductance, Rr is the rotor winding resistance, and $I_{NO-LOAD}$ is the no load current and where Ls, Lm, Lr, Rr, and $I_{NO-LOAD}$ are all obtained from the motor data sheet. In that case, the service personnel may calculate the parameters $L\sigma$, $\tau_{R\_INIT}$, $I_{dINIT}$ and provide them to the logic 48 by the service tool 80. Alternatively, the service personnel may provide the parameters Ls, Lm, Lr, Rr, and $I_{NO-LOAD}$ to the logic 48 by the service tool 80, and the logic 48 calculates the parameters Lσ, $\tau_{R\ INIT}$, $I_{dINIT}$ at the step 202. Other techniques may be used to obtain the initial parameters necessary to carry out the present invention.

It should be understood by those skilled in the art of motors that $I_{NO-LOAD}$ is equal to the total motor current when the motor is under no load or torque, i.e., Iq=0. Thus, $I_{NO-LOAD}$ is equal to the rated d-axis (or magnetizing) current $I_{dRATED}$.

Next, a series of steps 206 sets $\tau_R$ to the initial value $\tau_{RINIT}$, sets $I_{dREF}$ to the initial value $I_{dINIT}$, sets MODE=1 and a variable COUNT=1. Then, a step 212 calculates a value for $\tau_R$ with Id at the current setting of $I_{dREF}$, discussed more hereinafter with FIG. 6. Next, a step 214 checks whether a fault has been detected in the step 212. If so, the logic 66 sets MODE=0 at a step 215 and exits.

If a fault has not been detected, the logic performs a series of steps to check the motor voltage and, if needed, adjusts the magnetizing current Id. In particular, an optional step 216 runs the elevator in the up direction to get the elevator above the ground floor, if needed. Then, a step 218 runs the elevator in the down direction to take measurements. While the elevator is running in the down direction, a step 220 saves the values of Vd and Vq when the speed $\omega_R$ is at the end of (or during) the constant speed portion of the speed profile, to achieve steady state voltage measurement which cannot be obtained while the speed and/or torque are changing. Instead of running the elevator down to get Vm, the elevator may be run up, provided the motor is "pulling" a load, i.e., the motor is operating in a "motoring" operation as opposed to a regenerating or a braking operation, as this is the condition under which the drive is supplying power to the motor. To achieve this condition for an up run with the system shown in FIG. 1, the load in the car plus the car weight must be heavier than the counterweight.

Then, a step 222 calculates the measured total motor voltage using the vector sum equation: $V_M=(Vd^2+Vq^2)^{1/2}$. The steady state voltage Vm during the constant speed portion of the run should approximately equal the rated line-to-line voltage ($VLL_{13}$ RATED) adjusted for differences between the nameplate rated speed in rpm ($RPM_{13}$ RATED) and the maximum (or contract or duty) speed in rpm of the speed profile for that building application ($RPM\_DUTY$). Because the motor is operated with an empty car during the auto-calibration procedure, the motor voltage during an empty car down run will be slightly lower than the full car up run voltage. Therefore, the target voltage $V_T$ for empty car down operation is set to about 98% of the adjusted nameplate voltage. Thus, the target voltage $V_T$ is calculated at a step 223 by the equation:

$$V_T=(K \times VLL_{13}\ RATED \times RPM_{13}\ DUTY)/RPM_{13}\ RATED$$

where K is a predetermined percentage, e.g., 98%, $VLL_{13}$ RATED is the rated line-to-line voltage and $RPM_{13}$ RATED is the rated speed in rpm, both from the motor nameplate data, and $RPM_{13}$ DUTY is the duty or contract or maximum speed of the speed profile for that building application. The needed parameters may be provided by the service personnel from the service tool 80 over the link 82. Other percentages for the constant K may be used if desired.

Next, a step 224 tests whether the motor voltage $V_M$ is within 2% of the target voltage $V_T$. If not within 2%, a step 226 checks whether the loop has iterated at least five times. Typically, recalculation of $I_{dREF}$ is repeated approximately twice to get the magnetizing current to converge to the correct value. If it has iterated five times there is a problem with the system and a step 228 sets FAULT=1 which is sent to the service tool 80 (FIG. 1) over the serial link 82 and a step 215 sets MODE=0 and the logic exits. If it has iterated less than five times, a step 230 adjusts $I_{dREF}$ (and thus Id) by the equation: $I_{dREF}=I_{dREF}(V_T/V_M)$. Next, a step 232 increments the COUNT by 1 and the logic 66 proceeds to step 212. If $V_M$ is within 2% of $V_T$ in the step 224, the algorithm is deemed to have converged and a step 234 sets DONE=1 which is sent to the service tool 80 via the link 82 and a step 215 sets MODE=0 and the logic exits.

Figure 6:
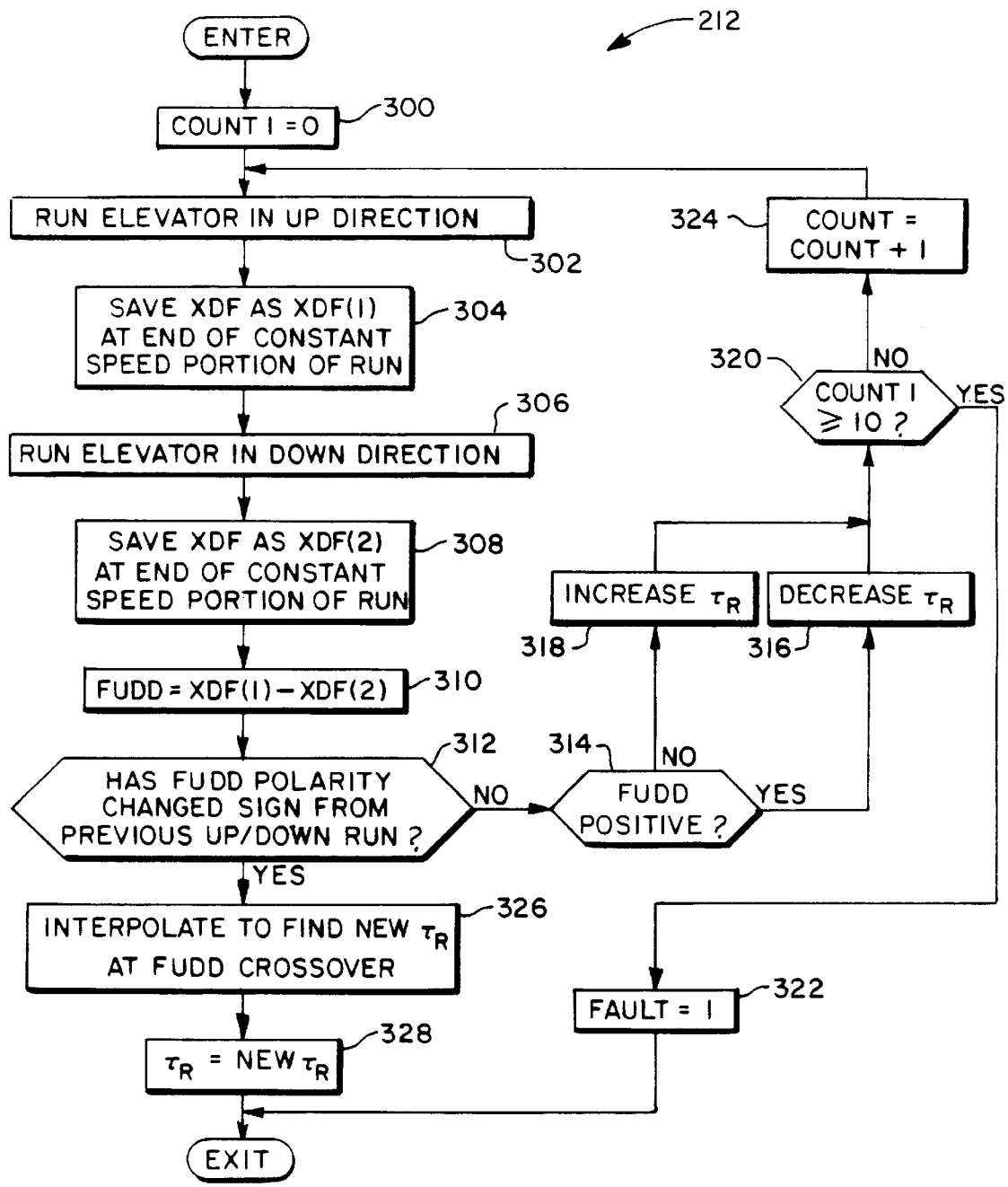
FIG. 6 is a logic flow diagram of a portion of the flow diagram of FIG. 5, in according with the present invention.

Referring to FIG. 6, the step 212 of FIG. 5, which calculates $\tau_R$ begins by setting a counter COUNT1=0 at a step 300. Next, a step 302 runs the elevator in the up direction using the standard speed profile (FIG. 7) discussed hereinbefore. During the up run of the elevator, a step 304 saves the values of XDF as XDF(1) when the speed $\omega_R$ is at the end of (or during) the constant speed portion of the speed profile.

Next, a step 306 runs the elevator in the down direction using the standard speed profile (FIG. 7) discussed hereinbefore. During the down run of the elevator, a step 308 saves the values of XDF as XDF(2) when $\omega_R$ is at the end of (or during) the constant speed portion of the speed profile of the run. Next, a step 310 calculates a filtered up/down difference (FUDD) equal to XDF(1)–XDF(2). The FUDD value for the run will indicate whether the $\tau_R$ is too high (FUDD>0) or too low (FUDD<0).

Next, a step 312 tests whether the sign (or polarity) of FUDD has changed from the FUDD for the previous up/down run of the elevator. If the sign of FUDD has not changed, a step 314 tests whether the sign of FUDD is positive. If FUDD is positive, $\tau_R$ is high and a step 316 decrements $\tau_R$ by a predetermined amount, e.g., 10%. If FUDD is not positive, $\tau_R$ is low and a step 318 increments $\tau_R$ by a predetermined amount, e.g. 10%. Other increment and/or decrement amounts may be used if desired.

Then, a step 320 tests whether the loop has iterated at least ten times (i.e., whether COUNT is greater than or equal to ten). If it has iterated at least ten times, a step 322 sets FAULT=1 which is transmitted via the serial link 82 to the service tool 80, and the logic 212 exits and returns to the logic 66 of FIG. 5. If it has iterated less than ten times, a step 324 increments COUNT1 by 1 and the logic 212 proceeds to perform another up/down run of the elevator starting at the step 302. If FUDD has changed sign in the step 312, then a step 326 linearly interpolates between the positive and negative FUDD values and the corresponding $\tau_R$ values to find a New $\tau_R$ value where FUDD crosses through zero, and a step 328 sets $\tau_R$ to the New $\tau_R$ and the logic 212 returns to the logic 66.

Other search techniques may be used if desired to iterate to the correct value of $\tau_R$. An alternative search algorithm for $\tau_R$ is to use a binary type search where the search range is narrowed in successive runs until the change in $\tau_R$ or FUDD is within a predetermined tolerance.

Also, the logic 66,212 monitors for a stop command (not shown) received by the service tool 80 over the link 82. If a stop command is received the logic 66,212 aborts the remainder of the procedure, goes to the step 215 and exits.

The order of direction for the up-down elevator is run is not critical to the present invention, e.g., the elevator may be run down in the step 302 and up in the step 306 (FIG. 6). However, typically, service personnel will run the elevator to the ground or first floor to begin service or calibration. In that case, running the elevator up first may be necessary to provide a run which has a long enough duration, as discussed hereinbefore with the standard profile.

Figure 9:
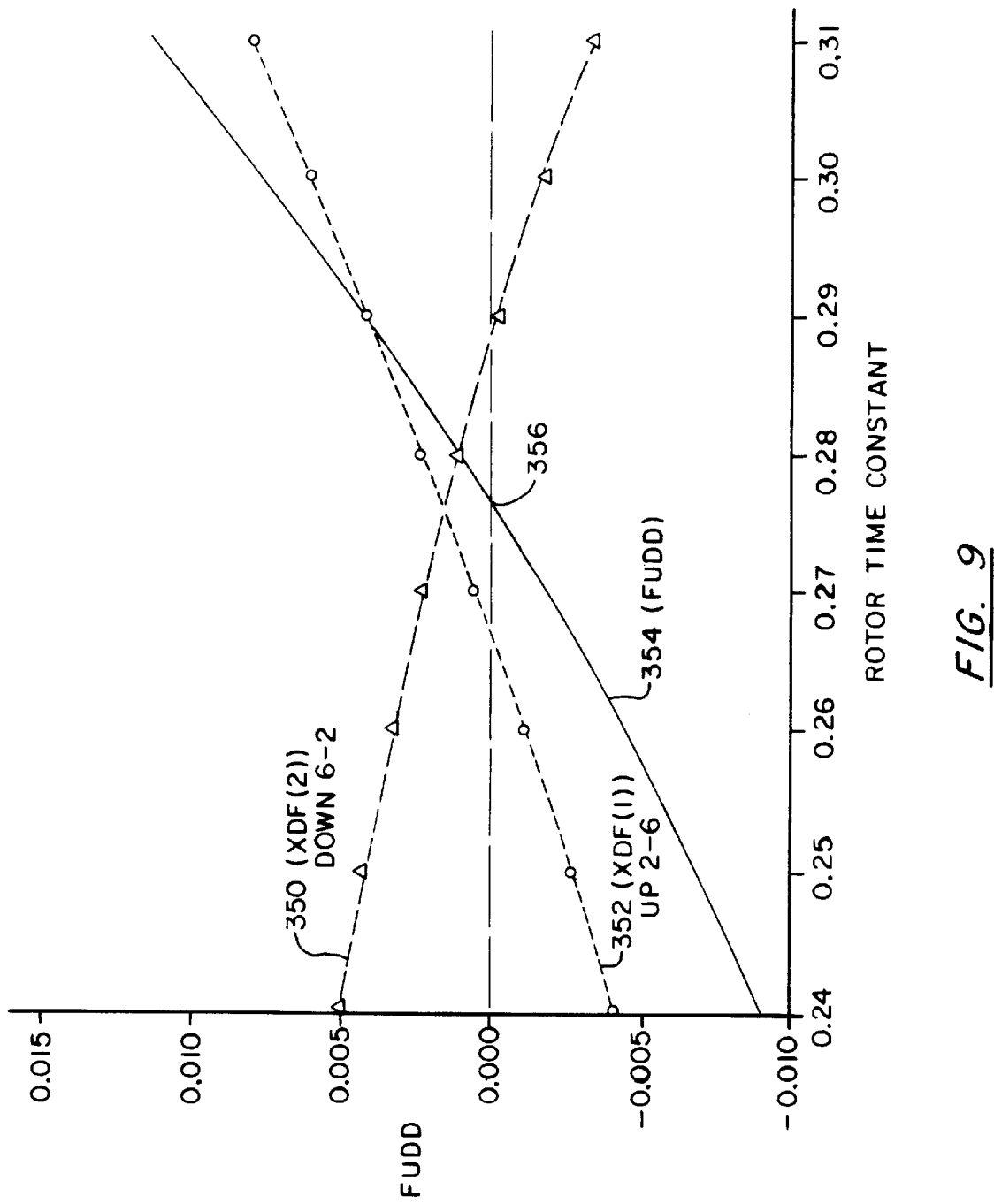
FIG. 9 is a graph of a loss component XDF and a filtered up/down difference FUDD vs. rotor time constant for an up run and a down run, in accordance with the present invention.

Referring to FIG. 9, the curve 352 of XDF(1) for the elevator up run and the curve 350 of XDF(2) for the down run is shown as well as a curve 354 showing corresponding values of the FUDD variable. XDF(1),(2) values and the FUDD value are plotted against the rotor time constant $\tau_R$ parameter for measurements made on a 2.0 meter per second geared hoistway. The curve 354 of FUDD is a smoothly varying, monotonically increasing curve with a well-defined zero-crossing at a point 356 which clearly indicates the correct value of the rotor time constant. The step 212 in the logic 66 calculates the value Of $\tau_R$ corresponding to where FUDD crosses through zero shown as the point 356 on the FUDD curve 354.

While an empty car may be the easiest condition to obtain, the invention will also work at full load or partial load, provided a net load imbalance is achieved between the car and the counterweight. However, for a load condition (such as full load) which causes a net load imbalance such that the car plus its load is heavier than the counterweight, the slopes of the graph of FIG. 9 would change, and the search logic would change correspondingly.

Instead of using the filter 62, the signal VDX may be sampled directly by the logic 66 without a filter. In that case, the logic 212 would sample the value of VDX at the end of (or during) the constant speed portion of the run in steps 304,308 and VDX would replace XDF where ever it is referenced herein. Alternatively, instead or in addition to filtering VDX, the input signals to Eq. 5 for VDX may be filtered. Alternatively, the VDX calculation logic 50 may calculate VDX only when the motor speed is above a certain speed or has been at duty speed for a predetermined period of time.

Although the invention has been described and illustrated with respect to exemplary embodiments thereof, it should be understood by those skilled in the art that the foregoing, and various other changes, omissions and additions may be made without departing from the spirit and scope of the present invention.

What is claimed is:

1. A method for calculating at least one parameter of an elevator motor operated by a field-oriented controller, comprising the steps of:
   a) setting a rotor time constant ($\tau_R$) and a magnetizing current (Id) to initial values;
   b) running the elevator in a first direction;
   c) calculating a loss component VDX during the elevator run as follows:

$$VDX = Vd + (\omega_R + Iq/(Id\tau_R))L\sigma Iq$$

where:
   Id=d-axis current
   Iq=q-axis current
   Vq=q-axis voltage
   $\omega_R$=motor speed
   L$\sigma$=motor transient inductance
   where Vd, Id, Iq, $\omega_R$, are signals provided by the field-oriented controller;
   where L$\sigma$ is a predetermined motor constant;
   d) running the elevator in a second direction, opposite to said first direction;
   e) performing step (c) during the elevator run in said second direction; and
   f) varying $\tau_R$, performing steps (b)–(e), and determining the value of $\tau_R$ at which the value of XD for the elevator runs for both directions are substantially the same, within a predetermined tolerance.

2. The method of claim 1, further comprising, after step (f), the steps of:
   h) running the elevator in a predetermined direction;
   i) calculating a motor voltage (Vm) as follows:

$$Vm = (Vd^2 + Vq^2)^{1/2};$$

j) calculating a target voltage ($V_T$); and
   k) varying Id and performing steps (b)–(j) until Vm is within a predetermined tolerance of $V_T$.

3. The method of claim 2 wherein in said step of varying Id, the next value of Id is Id($V_T$/Vm).

4. The method of claim 2 wherein $V_T$ is calculated as follows:

$$V_T = (K \times VLL\_RATED \times RPM\_DUTY)/RPM\_RATED$$

where:
   K=a predetermined percentage;
   VLL_RATED=rated motor voltage;
   RPM_RATED=rated motor speed; and
   RPM_DUTY=contract motor speed.

5. The method of claim 1, wherein step (c) further comprises filtering VDX with a filter during the elevator run.

6. The method of claim 1 wherein the value of $\tau_R$ is determined by:
   calculating a difference (FUDD) between VDX for the elevator runs in said first and second directions;
   varying $\tau_R$ until FUDD changes sign; and
   performing a search algorithm to determine the approximate value of $\tau_R$ at which FUDD crosses through zero, within a predetermined tolerance.

7. The method of claim 6 wherein said search algorithm comprises interpolating between the values of FUDD and $\tau_R$ for current and previous two-way elevator runs.

* * * * *